Aug. 14, 1934.    G. A. HEALIS ET AL    1,970,140
SWITCH CONTROL SYSTEM AND APPARATUS
Original Filed Sept. 21, 1931    7 Sheets-Sheet 1

INVENTORS
George A. Healis
Albert C. Graves

INVENTORS
George A. Healis.
Hubert C. Graves Jr.

Aug. 14, 1934.　　G. A. HEALIS ET AL　　1,970,140
SWITCH CONTROL SYSTEM AND APPARATUS
Original Filed Sept. 21, 1931　　7 Sheets-Sheet 6

INVENTORS
George A. Healis
Hubert C. Graves

Aug. 14, 1934.  G. A. HEALIS ET AL  1,970,140
SWITCH CONTROL SYSTEM AND APPARATUS
Original Filed Sept. 21, 1931   7 Sheets-Sheet 7

INVENTORS
George A. Healis
Aubert C. Graves Jr.

Patented Aug. 14, 1934

1,970,140

UNITED STATES PATENT OFFICE 1,970,140

SWITCH CONTROL SYSTEM AND APPARATUS

George A. Healis, Philadelphia, and Herbert C. Graves, Jr., East Bradford Township, Chester County, Pa., assignors to I-T-E Circuit Breaker Company, Philadelphia, Pa., a corporation of New Jersey Application September 21, 1931, Serial No. 563,962
Renewed July 3, 1934

11 Claims. (Cl. 175—294)

Our invention relates to switching systems, and particularly to relay circuits controlling circuit-breakers and the like.

In accordance with our invention, a relay for controlling the circuit of the closing mechanism of a circuit breaker is so constructed and connected that upon tripping of the breaker in response to abnormal circuit conditions, immediate and repeated reclosure of the breaker is prevented even though the control switch of the relay is held in the position normally resulting in closure or resetting of the breaker.

More specifically, closing of the control switch energizes two coils of the relay, one of which predominates in its attraction upon the relay armature to effect energization of the circuit-breaker closing means; upon completion of its closing movement, the breaker deenergizes the stronger coil, as by opening its circuit, and if the control switch is still closed, the weaker coil attracts the armature and holds it, preventing the stronger coil when re-energized from moving the armature, until the control switch is opened and again reclosed.

Further, in forms of our invention in which the control switch may be closed momentarily, completion of closing of the breaker is nevertheless ensured by a circuit established by the relay and opened only upon closure of the breaker.

Our invention further resides in the features of combination, construction and arrangement hereinafter described and claimed.

For an understanding of our invention, and for an illustration of some of the forms it may take, reference is had to the accompanying drawings, in which.

Figure 1:
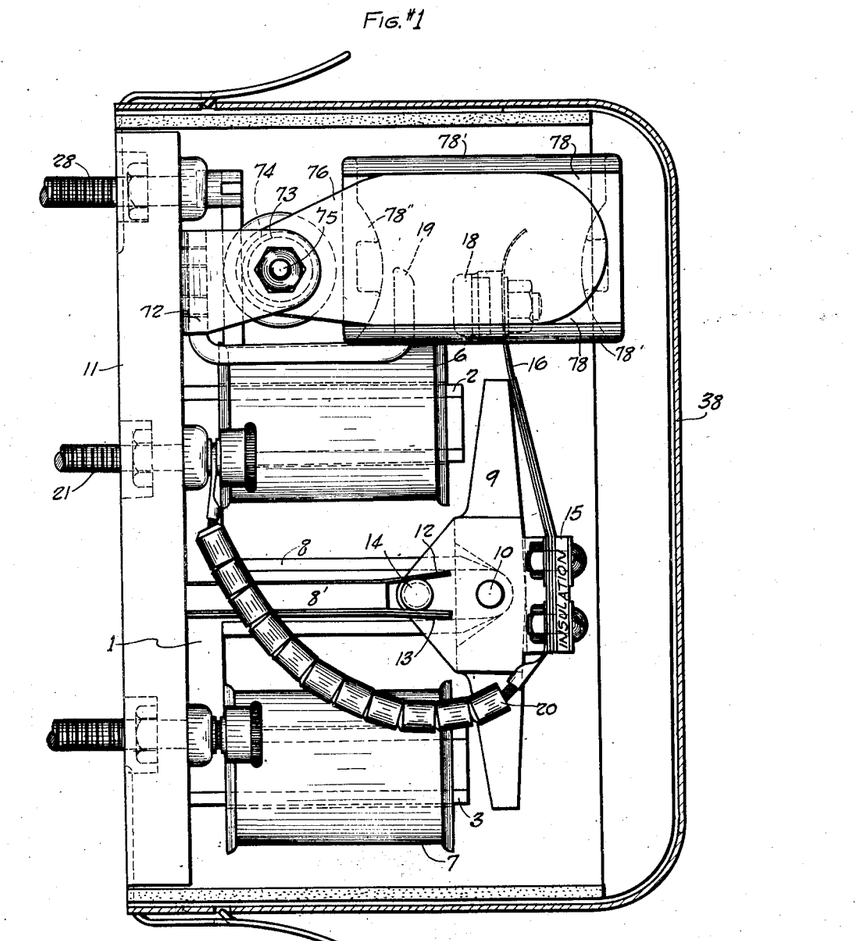
Fig. 1 is a side elevational view of a relay, with a portion of its cover removed, and constructed in accordance with our invention.

Referring now particularly to Fig. 1 of the drawings, there is shown a side view of one form of our relay with a portion of its cover 38 removed in order to disclose its construction. A vertical laminated magnetic core 1, in the form of the letter E, and mounted on a panel 11 of insulation, has horizontal legs 2 and 3 extending perpendicular to its base, the legs being surrounded by energizing coils or electromagnets 6 and 7, respectively. A middle leg 8 extends from the base 1 and carries an armature 9 pivoted at 10, the armature having surfaces near its top and bottom which may approach the pole faces 2 and 3 when the armature revolves about its pivot. The armature is restrained in an intermediate position with respect to the pole pieces by flat springs 12 and 13 which are attached in any suitable manner to a block 8' on the middle leg of the magnet, the outer resilient ends of the springs bearing against a round lug 14 which is secured to the armature structure, thus biasing the armature to an intermediate position. If the armature is rotated counter-clockwise, the lower spring 13 is deflected, and if the rotation is clockwise, the spring 12 is deflected, either action tending to restore the armature to mid-position.

Figure 2:
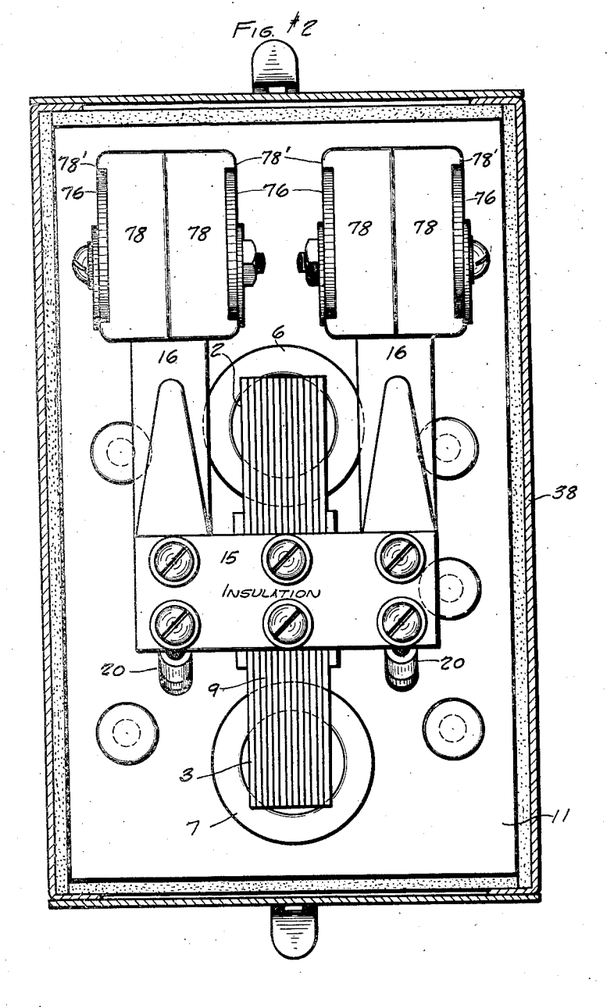
Fig. 2 is a front elevational view, with a portion of the cover removed, of the relay of Fig. 1.
Figure 3:
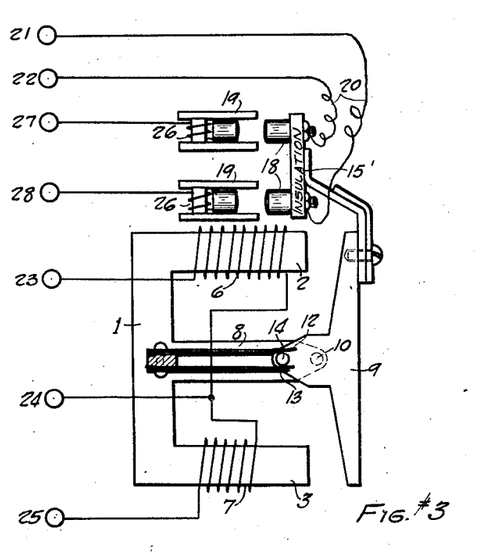
Fig. 3 is a diagrammatic view of the relay of Figs. 1 and 2 with its electrical circuits.

Preferably, and as shown in Figs. 1 and 2, the armature has secured to its outer surface a plate 15 of insulation which supports one or more contact arms 16, the contact arms in turn supporting contact buttons 18, although any other suitable arrangement may be employed, such as that of Fig. 3 in which a plate 15' of insulation supports the contact buttons 18 in the manner shown. An electrical circuit is made from the buttons 18 through arms 16 and flexible insulated conductors 20 to binding posts 21 and 22 which pass through the panel 11 upon which the relay structure is mounted to provide a rear connection.

The upward movement or counterclockwise rotation of the armature 9 effects a contact between the contact buttons 18 and complementary stationary terminals 19, and thus controls both sides of an electrical circuit connected to terminals 21, 22, 27 and 28, (see Fig. 3). Magnetic blowout coils 26 are connected in circuit with each of the stationary terminals 19 to suppress or prevent arcing when the contacts are opened.

Figure 4:
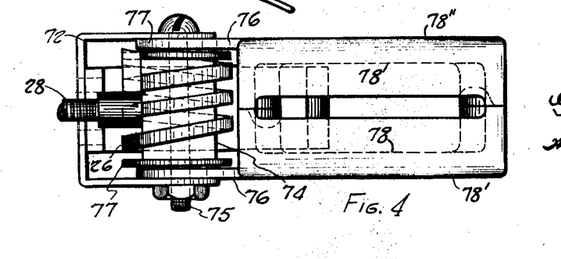
Fig. 4 is a detail of the stationary contact structure of the relay, showing the magnetic blowout and barrier arrangement.

The stationary contact assembly comprises various features which form the subject of a separately claimed invention, and will therefore be only briefly described here. One of the contact assemblies is shown in side elevation in Fig. 1, and comprises a generally U-shaped copper bracket 19 having one side secured to the relay base 11, the other side forming the terminal contact and barrier support. One end of a magnetic blowout coil 26, shown in detail in the plan view of Fig. 4, is connected to the bracket 19, the other end of the coil being connected to a binding post or terminal 28. The blowout coil has a magnetic core 73, preferably of iron, passing through the coil and insulated therefrom by a fiber bushing 74. Pivotally mounted on the ends of the core by a screw 75 are flat iron pole pieces 76, which are insulated from the coil by fibre washers 77. The pole pieces extend so that the contacts 18 and 19 are broken within, and the arc extinguished by, the magnetic field between the pole pieces.

Blowout barriers 78 of refractory insulating material enclose each pair of contacts on all sides and the top to confine the arc and to insulate the pole pieces and coil from the arc. Each barrier is made up of two identical halves which meet each other, as seen in the plan view of Fig. 4, and which, when their concave surfaces are in opposed relation and in normal position, have complementary lugs to prevent relative sliding motion between the halves. At the top and bottom of each half are outside flanges 78' which engage the top and bottom edges of the flat pole pieces, so that the pole piece and barrier assembly may be rotated as a unit about the pivotal point 75. The flanges 78' of the barriers are slidable on the edges of the pole pieces, and if the pole piece and barrier assembly is raised or rotated in a counterclockwise direction (with the relay cover 38 removed) until the barriers clear the contacts, the barriers may be readily removed, by sliding them forwardly, to give free access to the contacts for inspection, repair or replacement purposes. The barriers may also be easily reinserted by sliding them along the pole pieces until they touch the coil 26, and then lowering or rotating the pole piece and barrier assembly in a clockwise direction until the inner web 78" rests on the bracket 19, as shown in Fig. 1, in which position the toe of the bracket holds and prevents removal of the barriers.

When the relay armature 9 is in its intermediate or midway position (shown in Fig. 1) the circuit contacts are open, as is also the case when the armature is rotated in a clockwise direction towards the magnet pole 3.

The energizing coil 6 has one end of its winding connected to binding post 23, and the other end connected to binding post 24, which is common to both coils 6 and 7. The other end of coil 7 is connected to binding post 25. The energizing coils or electromagnets 6 and 7 are so connected in circuit that the flux produced by the lower coil passes into the lower end of the armature and returns through the middle leg 8 of the core structure. The action of the upper coil is similar, producing a flux in the middle leg flowing in the same direction as that produced by the lower coil. Thus, the magnetic forces are independent, and the pull or attraction between the upper and lower pole pieces and the armature depends upon the strength of the energizing coils. The coils are so wound that when either of them is energized it can overcome the resistance of the biasing springs and draw the armature against its pole face. The upper coil 6, however, has a greater number of ampere turns than the lower coil 7, so that when the coils are energized simultaneously the upper coil predominates and attracts the armature to the upper pole piece 2. When either coil is holding the armature against its pole piece and the other coil is energized, the armature will not change position. Therefore, if the coils are energized simultaneously, the stronger coil 6 will attract the armature to its pole, but upon deenergization of the stronger coil, the weaker coil 7 will attract the armature to its pole face and the armature will be maintained in this position, notwithstanding a reenergization of the stronger coil, until the weaker coil is deenergized. Upon deenergization of both coils the armature returns to its intermediate position.

Instead of employing energizing coils each with a different number of ampere turns, the relay may also be given its directional characteristic by designing and shaping the pole pieces of the electromagnets so that the one corresponding to electromagnet 6 will have a greater pull on the armature, or the armature may be so shaped and spaced, with respect to the magnet poles, as to cause one of the electromagnets to effect a greater pull thereon. It is also possible, by a suitable design, to use solenoid windings instead of the coils 6 and 7, with solenoid plungers cooperating therewith, the plungers controlling the position of the contact carrying arm in the manner of the relay.

The relay as above may be used in combination with various electrical devices for control purposes, and is particularly adapted for use in combination with other devices as, for example, pallet switches, to control a circuit breaker in the manner shown in Figs. 5 to 8 of the drawings.

Figure 5:
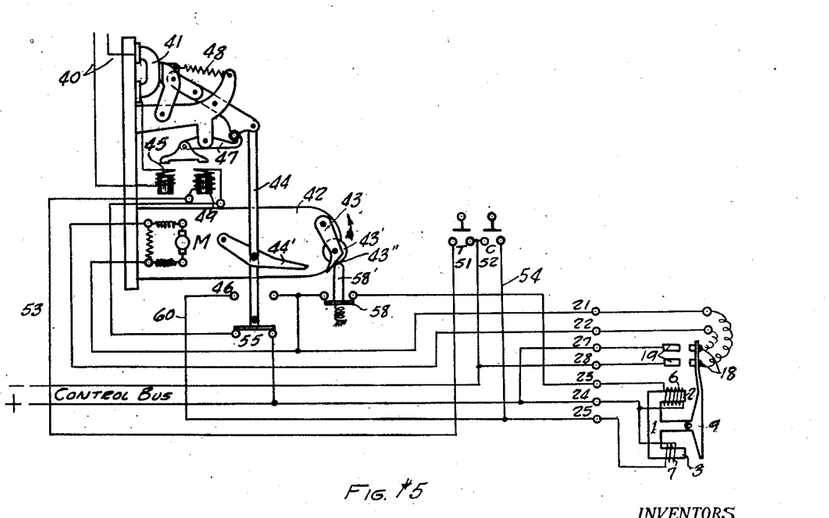
Figs. 5, 6, 7 and 8 illustrate various combinations of switch control means including the relay of Figs. 1 and 2, and their respective electrical circuits.

In the arrangement of Fig. 5 a feeder circuit 40 is controlled by a circuit breaker 41 (shown in closed position), the circuit breaker having electromotive means, such as a motor M and associated mechanism indicated generally by reference numeral 42, for closing the same. The circuit breaker shown is adapted for remote control, and the motor M is caused to rotate a crank 43 in a counterclockwise direction, which crank operates in conjunction with the link 44 and lever 44' to cause the breaker to close. During the closing movement of the breaker the roller 43' on crank 43 presses down on the lever 44' until it reaches a latching position; the roller then passes off the end of the lever, and an extension 43" of the crank engages a cam surface on the end of the switch element 58' to momentarily depress the element and open pallet switch 58. Due to the inertia of the motor mechanism, the crank 43 and its extension 43" pass by the cam surface, and switch 58 is immediately reclosed by spring action.

Pallet switches 46 and 55 are controlled mechanically by the position of link 44; switch 46 is open when the circuit breaker is closed, and is closed when the circuit breaker is open; and switch 55 is closed when the circuit breaker is closed, and is open when the circuit breaker is open. The tripping solenoid 49 is controlled by a tripping button 51, and the motor mechanism is controlled by a closing button 52. The energizing circuit of the motor mechanism is also controlled by the contacts 18 and 19 of the relay, and the energizing coils of the relay are in circuit relation with various of the auxiliary and pallet switches shown.

The breaker is normally held in closed position by a switch latch 47, which latch may be disengaged by energizing either the overload solenoid 45 or the tripping solenoid 49, either solenoid plunger being adapted to rise and strike the tail of the latch lever. A spring 48 gives a quick break action to the circuit breaker contacts during the opening movement.

The operation of the circuit is as follows:

When the tripping button 51 is depressed, a circuit is completed from the positive side of the control bus through switch 55, tripping coil 49, conductor 53, tripping button 51 (which is now closed) and the conductor 50 to the negative side of the control bus. The current flow through the circuit thus established is sufficient to lift the plunger of solenoid 49 which strikes the tail of latch lever 47 and opens the circuit breaker.

When the circuit breaker is open, the switch 55 is open and switch 46 is closed, and if it is desired to close the circuit breaker from an open position, the operator presses the closing button 52. This completes a circuit from the positive control bus to binding post 24 of the relay, through relay coil 7 to binding post 25, and thence through conductor 54, closing button 52 and conductor 50 to the negative bus. At the same time a circuit is established through binding post 24 and relay coil 6, binding post 23, switch 58, switch 46 (which is now closed), conductor 60, closing button 52, and conductor 50 to the negative bus. Thus the relay coils 6 and 7 are energized simultaneously and both exert a pull on armature 9. Since the flux produced by coil 6 is stronger than the flux produced by coil 7, the armature is attracted to the pole of the stronger magnet and closes the relay contacts 18 and 19, which completes the circuit between binding posts 21 and 28, and 22 and 27, respectively.

The action of the relay performs two functions:

(a) It short-circuits the closing button 52 by completing a circuit from the negative control bus to binding post 28, through the lower pair of relay contacts 18 and 19, binding post 21, through pallet switch 46 (which is now closed) and wire 60 to conductor 54 connected to the relay side of the closing button. This maintains the coils 6 and 7 in an energized condition, even though the button 52 may be depressed momentarily only.

(b) The relay closes a circuit from the positive bus to binding post 27, through the upper pair of relay contacts 18 and 19 to binding post 22, to the energizing and brake coil windings of motor M, returning by way of binding post 21, lower relay contacts 18 and 19, and binding post 28 to the negative bus. This causes the motor to start, rotating the crank in a counterclockwise direction to effect closing of the circuit breaker 41 in the manner heretofore described. Immediately after the latching of the circuit breaker in closed position, the extension 43" of the crank engages the element 58' of switch 58 to cause a momentary break in the circuit of relay coil 6. This releases the armature 9 which returns to its mid-position by reason of the biasing action of the springs, and opens the circuit between binding posts 21 and 28, and 22 and 27, thus opening the motor circuit. If, during this operation, the operator has held the closing button 52 in the closed position, the relay armature, upon being released from pole piece 2, will be rotated in a clockwise direction until it is held against pole piece 3, since the coil 7 is energized through the closing button.

If, as described above, button 52 is held depressed after the circuit-breaker is closed, and an excess flow of current occurs in the main circuit 40, thus unlatching the switch by actuating the overload solenoid 45, then, since the switch 46 is closed a circuit is completed through relay coil 6. While this coil is stronger than the other coil, it is not able to attract the armature away from the pole piece 3, consequently, there is no possibility of the motor repeatedly closing the circuit breaker when an abnormal condition exists in the main circuit 40 and the closing button is held depressed.

Figure 6:
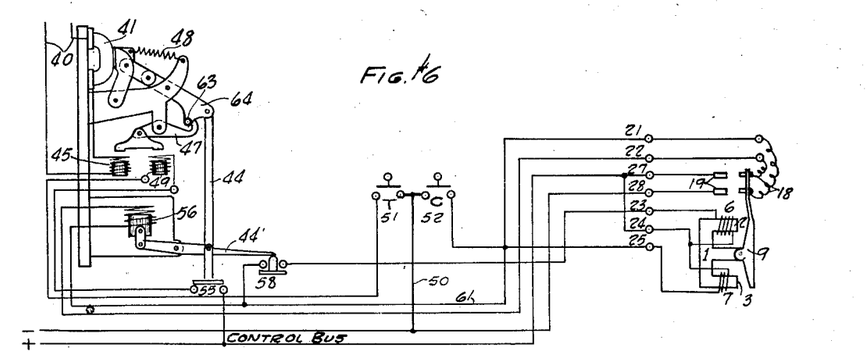

Another control arrangement is shown in Fig. 6 in which the circuit breaker 41 is adapted to be closed by a solenoid 56. It will be noted that in this circuit there is no switch corresponding to switch 46 of Fig. 5, but a pallet switch 58 is provided which breaks the circuit of the stronger relay coil 6 at the end of the closing movement of the circuit breaker, the switch being held in an open position by the lever 44', as long as the circuit breaker is closed. When the breaker is open the switch 58 is closed, and if the closing button 52 is depressed a circuit is completed from the positive control bus to binding post 24, relay coil 6, binding post 23, through pallet switch 58 (now closed), conductor 61, closing button 52 and conductor 50 to the negative bus. At the same time a circuit is established from the binding post 24 through relay coil 7, binding post 25, through the closing button 52 and conductor 50 to the negative bus, and thus the coils 6 and 7 are connected in parallel.

As soon as the circuit breaker reaches its closed position the pallet switch 58 is opened, and therefore the circuit of coil 6 is opened. Coil 7 remains energized, however, as long as the closing button is depressed, and attracts the relay armature structure to its pole, consequently, there is no possibility of the closing solenoid 56 repeatedly closing the circuit breaker if the same is tripped or abnormal conditions obtain, while the closing button is held depressed. This arrangement is suitable where a solenoid is used to close the circuit breaker, instead of the motor mechanism of Fig. 5, since in the solenoid the cut-off time of the pallet switch is not required to be as sharp as is necessary in the use of motor closing mechanism.

Figure 7:
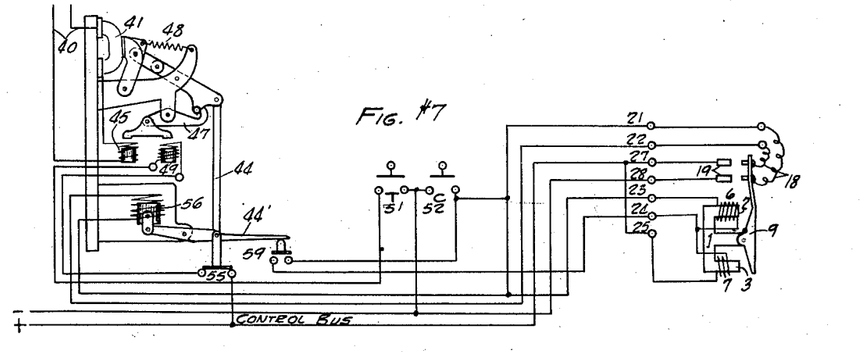

A variation of the arrangement of Fig. 6 is shown in Fig. 7, in which the relay coils are connected in series, with the stronger coil disabled by being short circuited, instead of having its circuit opened as in the arrangement of Fig. 6. The pallet switch 55 is closed when the circuit breaker 41 is closed, and the pallet switch 59 is open when the circuit breaker is open. The switch 59, however, is closed at the extreme end of the solenoid closing stroke by the overtravel of lever 44, and is opened upon de-energization of the closing solenoid 56 when its energizing circuit is broken by the relay contacts 18 and 19.

The overtravel is obtained as follows:

When the solenoid closes the breaker 41, the latch roller 63 on the operating arm 64 is drawn down against the outer surface of the latch 47, forcing the right hand end down until the roller passes over the catch and allows the latch to rise and engage the roller. A slight clearance exists between the roller and latch at this time. The arm is then allowed to move back a short distance, taking up the clearance and letting the latch carry the load. This difference in the extreme closing position and final latched position produces an overtravel in lever 44' which is utilized to make the contact of switch 59.

When the circuit breaker is open and it is desired to close the same, the operator depresses the closing button 52. This closes a circuit from the positive bus to binding post 25, through relay coil 7, through relay coil 6, to binding post 23 and switch 52 to the negative bus. The stronger coil 6 attracts the armature and closes relay contacts 18 and 19 to energize the closing solenoid 56. A localizing or holding circuit is also provided by the closure of the lower relay contacts 18 and 19 which short-circuit the closing button 52, so that the coils 6 and 7 are maintained in an energized condition, even though button 52 is depressed momentarily only. At the end of the closing stroke the pallet switch 59 is momentarily closed, thus short-circuiting relay coil 6 and allowing the armature to be attracted by coil 7 against the lower pole face 3 where it is maintained, notwithstanding the reenergization of the stronger coil if the breaker should be tripped and closing switch 52 held depressed. This provides the non-repeat characteristic previously described. In this arrangement the switch 59 need not be timed, since the short-circuiting of coil 6 causes a delay in the armature change-over, the time of which may be increased by placing copper washers over the core of coil 6 to delay its releasing action.

Figure 8:
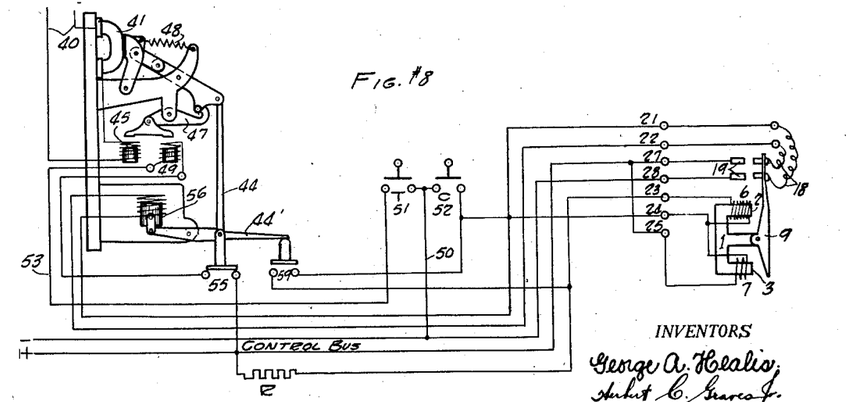

Fig. 8 shows an arrangement in which the relay coils are connected in parallel with the stronger coil short circuited with a resistance R in circuit. When the circuit breaker is open, and it is desired to close the same, the operator presses the button 52 which closes a circuit from the positive control bus to binding post 25, relay coil 7, binding post 24, closing button 52 and return by conductor 50 to the negative bus. Another branch of this circuit is closed from the positive bus through the resistance R to binding post 23, relay coil 6, binding post 24, to binding post 21, lower relay contacts 18, 19, binding post 28 and return to the negative bus, thus localizing the relay when its contacts are closed. When the lever 44' of the circuit breaker is in its lower position during the closing of the breaker, the pallet switch 59 is momentarily closed. This short-circuits the relay coil 6 which is thus de-energized, and the armature is attracted to the lower pole face 3, provided the button 52 is held closed. This action also gives the non-repeat characteristic described above. The switch 59 need not be timed because a time lag can be introduced by the use of short-circuiting washers at the end of the core of the stronger relay magnet.

Figure 9:
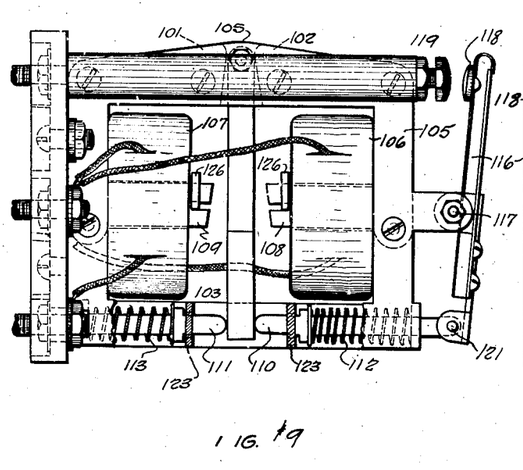
Figs. 9 and 10 are side and front elevational views, respectively, of a modification of the relay of Figs. 1 and 2.
Figure 10:
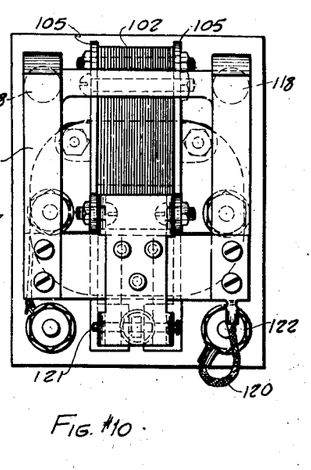
Figure 11:
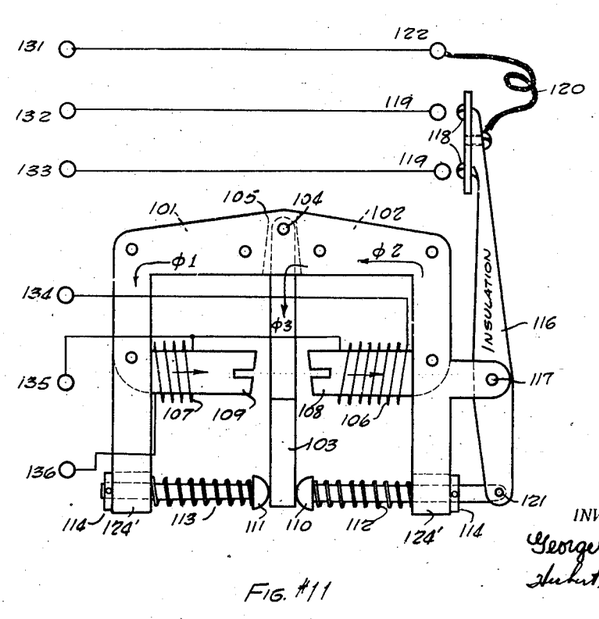
Fig. 11 is a diagrammatic view of a relay having the characteristics of the relay of Figs. 9 and 10, but with a slightly different construction.

Referring to Figs. 9, 10 and 11, there is shown a modified form of our relay which permits the use of a lighter armature which is adapted to give a somewhat quicker action. This relay consists of a pair of frames 105, preferably of non-magnetic material, which have secured between them two laminated U-shaped magnets 101 and 102. The magnet 101 has on its lower pole 109 an energizing coil 107, and magnet 102 has on its lower pole 108 an energizing coil 106. An armature 103 is pivoted at 104 in the upper part of the frames 105 between the upper poles of the magnets 101 and 102. The armature has its travel between the lower poles 108 and 109 and has an extending portion at its free end between a pair of spring plungers 110 and 111. Each of these plungers is supported and guided through its axial movement by the frames 105 and the guides 123 secured to the frames. The spring 112 tends to force the plunger 110 and the armature toward the left, whereas the spring 113 tends to force the plunger 111 and the armature toward the right. In the relay of Figs. 9 and 10, the guides 123 provide stops to limit the inward travel of the plungers, while in Fig. 11 stops 114 on the rear ends of the plungers limit their travel. The stops are preferably, but not necessarily, so adjusted that, by the action of the springs, the armature is resiliently held approximately midway between the magnet poles 108 and 109.

An extension of the plunger 110 is loosely connected by a pin 121 to a lever structure 116 which is fulcrumed at 117 to the frames 105. The upper end of the lever structure may comprise two arms carrying the contact buttons 118, as in Figs. 9 and 10, or it may comprise a single arm carrying a plate of electrically conductive material having buttons 118 arranged to make contact with complementary contacts 119 when the lever 116 rotates in a counterclockwise direction. A flexible conductor 120 completes an electrical connection between the contacts 118 and the terminal 122. The contacts 118 may be insulated from the lever structure in any desired manner, or the lever structure itself may be composed of insulation.

The mechanical connections between the armature 3 and the lever 116 are such that when the armature is pulled against the pole face 108 due to energization of the coil 106, the plunger 110 is moved to the right compressing its spring 112, and the end of the plunger by means of pin 121 rotates the lever 116 in a counterclockwise direction, about pin 117, forcing contact buttons 118 into contact with terminals 119, thus completing the electrical circuit between binding posts 131, 132 and 133; when the armature is released from the pole face 108, the spring 112 forces it to the left rotating the lever 116 in a clockwise direction, and moving contacts 118 away from contact with terminals 19, thus interrupting the circuit connections between binding posts 131, 132 and 133. When the armature is pulled against the pole face 109, due to the attraction of the coil 107, the plunger 111 is moved to the left compressing spring 113. When the armature is released from pole face 109, the spring 113 returns it to its intermediate position.

Binding posts 134, 135 and 136 are provided for the coils 106 and 107. When either of the coils is energized it can overcome the resistance of the biasing springs and draw the armature against its pole face. When the coils are energized simultaneously, the coil 6, which has the greater number of ampere turns, predominates and attracts the armature to its pole face 108. When either coil is holding the armature against its pole face and the other coil is energized, the armature will not change its position, the action of the coils in this respect being the same as that described in connection with the modification of Figs. 1 to 3.

The magnetic characteristics of this relay make it particularly suitable where high speed positive action is required. This characteristic is due to the flux distribution as indicated in Fig. 11 and the following discussion. Referring to Fig. 11, the coils 106 and 107 have current passing through them in such a direction that the fluxes produced in magnets 101 and 102 are in such a direction as to flow around the loop formed by the two magnets. The coil 106 has more ampere turns than coil 107, consequently its flux $\phi_2$ is greater than the flux $\phi_1$ of coil 107. This causes a flow of flux $\phi_3$ in the armature in the direction indicated by the arrow. The pull toward pole face 8 causes the contact making motion. Its equation may be determined as follows:

$$\phi_2 > \phi_1$$
$$\phi_2 = \phi_1 + \phi_3 = \text{total flux}$$
$$B = \text{flux density}$$
$$A = \text{pole face area}$$
$$P = \text{pull.} \frac{B^2 A}{8\pi} = \frac{\phi^2}{A} \times \frac{A}{8\pi} = \frac{\phi^2}{8A\pi}$$

Net pull on armature $$P_2 - P_1 = \frac{(\phi_1 + \phi_3)^2}{8A\pi} - \frac{\phi_1^2}{8A\pi}$$

$$\frac{\phi_1^2 + 2\phi_1\phi_3 + \phi_3^2 - \phi_1^2}{8A\pi} = \frac{2\phi_1\phi_3 + \phi_3^2}{8A\pi}$$

In a simple clapper type magnet the armature pull would have been equal to the armature flux squared over $8A\pi$, whereas in the relay of Figs. 9 to 11 the numerator is increased by the item $2\phi_1\phi_3$. If the clapper type magnet has maximum pull, the armature must have approximately the same cross section area as the core. In the relay shown the armature need have only about 50% of the core area. This decreases inertia and greatly increases speed.

Figure 12:
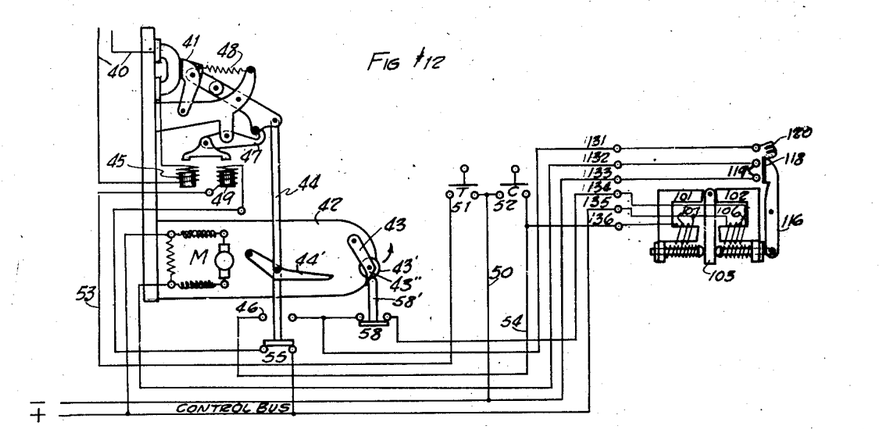
Figs. 12 and 13 illustrate various combinations of switch control means involving the relay of Figs. 9, 10 and 11.
Figure 13:
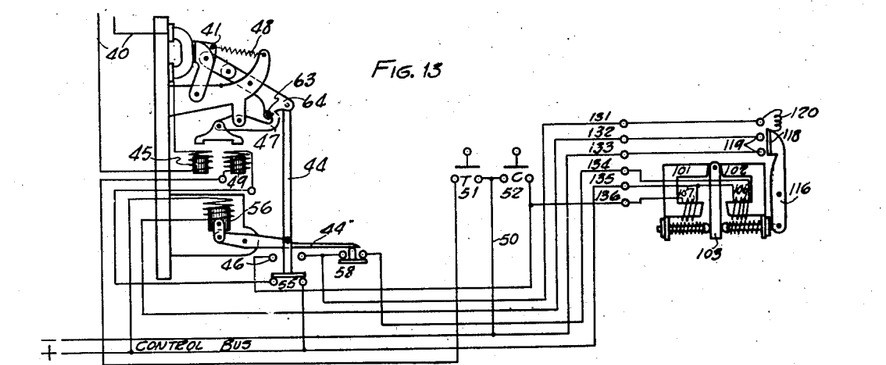

Figs. 12 and 13 show the relay of Figs. 9 to 11 in combination with a circuit breaker. Referring to Fig. 12, during the closing motion of the circuit breaker 41 the roller 43' on crank 43 presses down on the lever 44' until it reaches the latching position; the roller then passes off the end of the lever and an extension 43'' on the crank engages its cam surface on the end of the switch element 58' to momentarily interrupt the circuit through the pallet switch 58. As soon as the crank extension has passed by, a spring closes the switch in the manner of the arrangement of Fig. 5 hereinbefore described.

When the trip button 51 is depressed, current flows from the positive control bus through switch 55, tripping coil 49, conductor 53, switch 51 and conductor 50 to the negative bus. The current value is sufficient to lift the plunger of 49 which strikes the tripper and opens the circuit breaker. Pallet switch 55 is open and switch 46 is closed when the breaker 41 is open.

When it is desired to close the circuit breaker, the operator depresses the closing button 52. This permits current to flow from the positive control bus to binding post 135, through coil 107 to binding post 136, conductor 54 and closing button 52 to the negative bus. At the same time a circuit is established through binding post 135 and coil 106, binding post 134, pallet switch 58, switch 46 (which is now closed), conductor 54 and closing button to the negative bus. Thus the coils 106 and 107 are energized simultaneously and both exert a pull on the armature 103. The coil 106 is stronger than the coil 107 and pulls the armature to the right, rotating the contact carrying lever 116 counterclockwise, closing the contacts 118, 119 and completing the circuit connections between binding posts 131, 132 and 133. This action performs two separate functions:

(a) It short circuits closing button 52 by completing a circuit from conductor 50 to binding post 133, through the relay contacts, flexible conductor 120, binding post 131, pallet switch 46, and conductor 54. This maintains the coils 106 and 107 in an energized condition even though the button 52 is depressed momentarily only, and insures positive closing of the circuit breaker.

(b) It completes a circuit from the positive control bus through the energizing and brake coil windings of motor M, to binding post 132, relay contacts, binding post 133, to the negative bus. This starts the motor, rotating the crank in a counterclockwise direction to effect closing of the main switch 41. Immediately after the latching of the breaker, the extension 43'' of the crank 43 engages the element 58' of switch 58 to cause a momentary break in the energizing circuit of coil 106. This releases armature 103 which is returned to its intermediate position by the biasing spring, and opens the relay contacts, stopping the motor mechanism 42. If, during this process, the operator has held control button 52 in the closed position, then the coil 107 remains energized and the armature 103, upon being released from the pole piece of coil 106, will be drawn continuously across the pole gap until it is held against the pole piece of coil 107. The armature 103 is extremely light so that its motion under the influence of magnetic pull and the biasing springs is very fast. This enables it to complete its motion before the switch 58 has time to remake contact.

If, as described above, button 52 is held depressed after the circuit breaker is closed and an excess flow of current occurs in the main circuit 40, unlatching the breaker by actuating the solenoid 45; then the switch 46 closes and a circuit is completed through coil 106. While coil 106 is stronger than coil 107 it has not sufficient strength to draw the armature away from pole piece 107, consequently there is no possibility of the motor repeatedly closing the breaker when a short circuit or other abnormal condition exists in circuit 40 and the closing control button is held depressed.

Another combination involving the relay of Figs. 9 to 11 is shown in Fig. 13 in which a circuit breaker 41 is arranged to be closed by a solenoid 56. The arrangement is similar to that of Fig. 12, with the exception of switch 57 which is momentarily opened by the overtravel of lever 44, which breaks the circuit of coil 106 at the end of the closing motion.

Figure 14:
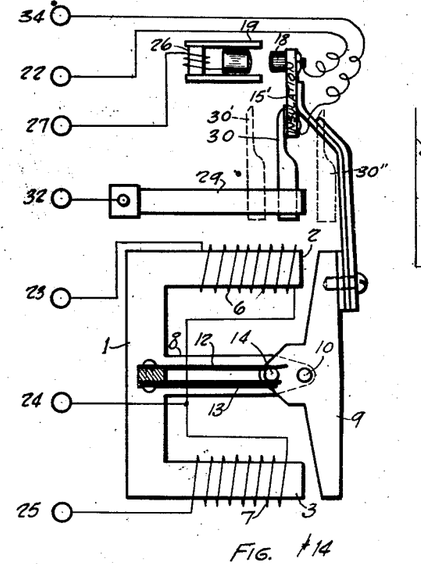
Fig. 14 shows another modification of the relay of Figs. 1 and 2.
Figure 15:
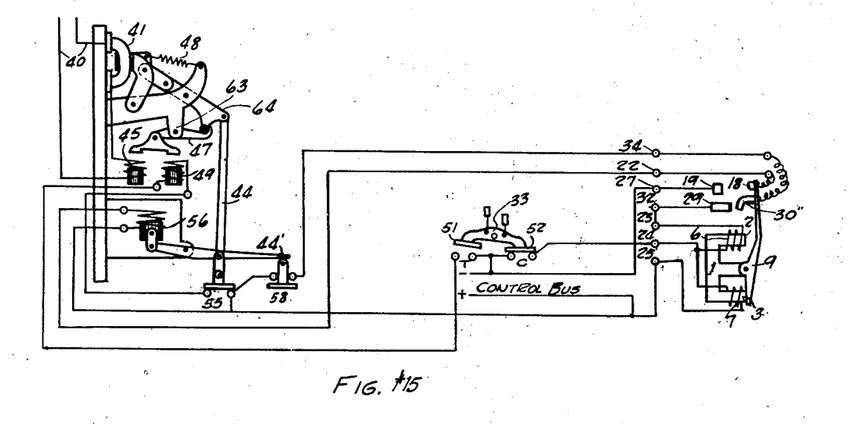
Fig. 15 illustrates a particular type of switch control means involving the relay of Fig. 14.

For certain kinds of service it is desirable or necessary to have the closing control circuit closed during the period the circuit breaker is closed, as, for example, in float switch control for pump motors, and Figs. 14 and 15 show a modification of our relay, and a control arrangement, for this type of service. The core structure and energizing coils are preferably, although not necessarily, the same as that of the relay of Figs. 1 to 3, but the contact assembly is different in that a fixed contact 29 is adapted to be engaged by a movable blade 30 preferably supported by the insulating block 15' which carries the movable contact 18. The contact 29 is of such length that it is engaged by blade 30 when the armature 9 is in its intermediate position, and thus the energizing circuit of coil 6 is normally closed between binding posts 32 and 34. When the coil 6 is energized, and the armature is rotated counter-clockwise until contacts 18 and 19 are closed, the blade 30 still remains in engagement with fixed contact 29, and moves to the position 30' indicated by dotted lines.

When the armature has been rotated in a clockwise direction by the action of coil 7, however, the blade 30 is disengaged from the contact 29 and assumes the position 30" shown by dotted lines, thus opening the circuit between binding posts 32 and 34.

Referring to Fig. 15 there is shown a solenoid operated circuit breaker 41, controlled by an over-center control switch, such as a float switch mechanism, mechanical reciprocating switch, or the like, indicated generally at 33. In such an arrangement it may be desirable to have the closing switch 52 remain closed until a given change of liquid level in a tank obtains, or until a mechanical device opens the switch on the happening of a predetermined condition.

With the switch 52 closed, as shown, the relay coil 7 remains energized by the current flowing from the positive bus to binding post 24, through the coil 7, binding post 24 and the now closed switch 52 to the negative bus. Since the coil 7 need only be strong enough to function as a holding coil, its impedance may be relatively high, and therefore it may remain on closed circuit without heating or drawing a large current from the control bus. The energizing circuit of coil 6 is opened by pallet switch 58 as soon as the circuit breaker has reached its closed position. Coil 7 is energized as long as switch 52 remains closed and rotates armature clockwise, opening contacts 18 and 19 and deenergizing the circuit of solenoid 56.

When the over-center control mechanism 33 opens the switch 52 and closes tripping switch 51, the circuit of relay coil 7 is opened, and the armature 9 returns to its mid-position by reason of biasing springs 12 and 13, so that the contacts 29 and 30 in the energizing circuit of relay coil 6 are closed. In this position, if switch 52 is again closed, current flows through coil 6, as well as coil 7, because switch 58 is now closed, and coil 6 will predominate to attract the armature 9 and close contacts 18 and 19 to energize the closing solenoid 56.

Due to the fact the contacts 29 and 30 are kept disengaged by the energization of relay coil 7 as long as the closing switch 52 remains closed, if the circuit breaker should be opened by the over-load solenoid 45 due to abnormal or other conditions, the coil 6 cannot be energized and thus the breaker will not be closed under such condition. The reclosing of the breaker can only be accomplished by opening the switch 52 to deenergize relay coil 7 and allow the armature 9 to return to its intermediate position, and then reclosing switch 52.

Figure 16:
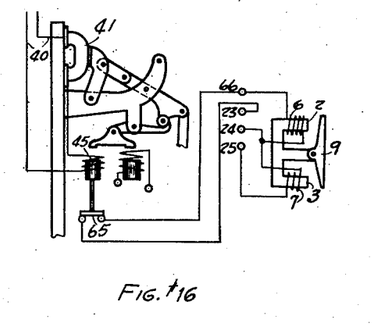
Fig. 16 shows a modified control arrangement applicable to any of the control systems disclosed.

Fig. 16 shows a modified control arrangement which may be applied to any of the preceding systems.

The over-load solenoid 45 of the circuit breaker 41 has a pallet switch 65 which is controlled by the solenoid plunger, and which is normally closed. As shown, the switch may be inserted in one side of the stronger relay coil 6, or 106, as the case may be, by adding another binding post 66 to the relay, the rest of the circuit remaining the same. When the overload solenoid is energized due to an abnormal or other condition, the solenoid plunger is drawn upward and switch 65 is opened, thus opening the energizing circuit of the stronger relay coil. This deenergizes the coil at any time during the closing stroke, and reduces the period of engagement of the circuit breaker contacts during the attempted closure.

In each of the foregoing circuits and arrangements, direct current for control purposes has been referred to, but alternating current may likewise be used, in which case an alternating current control bus would replace the direct current bus shown. When alternating current is used, the poles of either or both of the electromagnets of the relay may have copper washers placed thereon, as 126 in Fig. 9, or equivalent means, to delay the time of release of the relay armature, if necessary, to prevent chattering of the relay.

It will be understood that the closing and tripping buttons may be any other suitable type of switch or circuit closing device, adapted for either manual or automatic operation, dependent upon the nature of the control circuit employed, and that various switching means, other than pallet switches, whose position depends upon the condition of the circuit breaker, may be utilized in any of the above combinations and arrangements.

What we claim is:

1. In a circuit breaker control system, a tripping coil for opening the breaker, and an electromotive device for closing the breaker, an over-center control switch for controlling the closing and tripping circuits of the breaker, a relay having a holding coil and an operating coil, a pallet switch operable in accordance with the position of said breaker and connected in circuit with said operating coil, the relay having contacts controlling the circuit of said electromotive closing device and contacts controlling the circuit of said operating coil, the latter contacts being adapted to maintain the operating coil circuit open when the said over-center control switch stays closed after completion of the closing action of said electromotive device and the closing of the breaker.

2. The combination of a circuit breaker and a controlling means therefor, comprising electromotive means for closing said circuit breaker, electromotive means for tripping the breaker, pallet switches operated in accordance with the movement of said breaker, one of said switches being connected in the tripping circuit, and closed when the breaker is closed, the other pallet switch being opened at the end of the breaker closing motion, switching means for energizing the closing and tripping circuits, a relay comprising two electromagnets of unequal strength, either of which when energized will attract common armature from a biased intermediate position with respect to the poles of the magnets, the armature controlling normally open contacts in circuit with said electromotive closing means, normally closed contacts in circuit with the stronger magnet energizing coil, means for causing both relay coils to be energized when the said switching means for energizing the closing circuit is closed, the stronger coil predominating to attract the armature to its pole and close the said normally open contacts and maintain the normally closed contacts in engagement, means comprising said other pallet switch for opening the circuit of the stronger magnet when the circuit breaker has reached its closed position, and means for maintaining the weaker magnet in energized condition to attract the armature to its pole, thus disengaging both sets of relay contacts and preventing reenergization of the stronger magnet if the circuit breaker is caused to open while the said switching means for energizing its closing circuit remains closed.

3. In combination with a circuit breaker having electromotive means for operating the same, an overload solenoid for opening the circuit breaker, a switch controlled by movement of the solenoid core, a relay having contacts controlling the circuit of said electromotive means, and comprising two electromagnets and an armature controlling the position of said contacts, one of the magnets having a stronger field than the other magnet so that the armature will be attracted to the pole of the stronger magnet and close the relay contacts upon the simultaneous energization of both magnets, the weaker magnet having a field such that the armature will be attracted to its pole to open the said contacts upon deenergization of the stronger magnet and maintained in such position, notwithstanding a reenergization of the stronger magnet, until deenergization of the weaker magnet, means for energizing the stronger magnet, means comprising said switch controlled by the overload solenoid for disabling the stronger magnet when the overload solenoid is energized, means for disabling the stronger magnet when the circuit breaker reaches a closed position, and means for energizing the weaker magnet to attract the armature and hold the relay contacts open to prevent closing of the circuit breaker under predetermined conditions.

4. In combination with a circuit breaker having electromotive means for operating the same, an overload solenoid for opening the circuit breaker, a switch controlled by movement of the solenoid core, and having normally closed contacts, a relay having contacts controlling the circuit of said electromotive means, and comprising two electromagnets and an armature controlling the position of said contacts, one of the magnets having a stronger field than the other magnet so that the armature will be attracted to the pole of the stronger magnet and close the relay contacts upon the simultaneous energizaion of both magnets, the weaker magnet having a field such that the armature will be attracted to its pole to open the said contacts upon deenergization of the stronger magnet and maintained in such position, notwithstanding a reenergization of the stronger magnet, until deenergization of the weaker magnet, means for energizing the stronger magnet, means comprising said switch controlled by the overload solenoid for opening the circuit of the stronger magnet when the overload solenoid is energized, means for disabling the stronger magnet when the circuit breaker reaches a closed position, and means for energizing the weaker magnet to attract the armature and hold the relay contacts open to prevent closing of the circuit breaker under predetermined conditions.

5. A system for controlling the operation of a circuit breaker having closing means, comprising a relay having an armature, electro-magnets of different strength disposed to effect movement of said armature in different directions, a switch for energizing said electromagnets to effect movement of the armature by the stronger electromagnet to a position effecting energization of said closing means, and contact structure actuated by the circuit breaker substantially upon completion of its closing movement to open only the circuit of said stronger electromagnet, whereupon the weaker of said electromagnets attracts and holds the armature, so long as said switch is held closed.

6. A system for controlling the operation of a circuit breaker having closing means, comprising a relay having an armature, electromagnets of different strength disposed to effect movement of said armature in different directions, a switch for energizing said electromagnets to effect movement of the armature by the stronger electromagnet to a position effecting energization of said closing means, and contact structure momentarily actuated by the circuit breaker substantially upon completion of its closing movement effectively to de-energize said stronger electromagnet, whereupon the weaker of said electromagnets attracts and holds the armature, so long as said switch is held closed.

7. A system for controlling the operation of a circuit breaker having closing means, comprising a relay having an armature, electromagnets of different strength disposed to effect movement of said armature in different directions, a switch for energizing said electromagnets to effect movement of the armature by the stronger electromagnet to a position effecting energization of said closing means, a hold-in circuit including contacts closed upon said armature movement to ensure completion of closing movement of the breaker irrespective of said switch, and contact structure actuated by the circuit breaker substantially upon completion of its closing movement effectively to de-energize said stronger electromagnet, whereupon the weaker of said electromagnets attracts and holds the armature, so long as said switch is held closed.

8. A system for controlling the operation of a circuit-breaker having closing means and tripping means, comprising a relay having an armature, electromagnets of different strength tending to effect movement of said armature in different directions, a switch for energizing said electromagnets to effect movement of the armature by the stronger electromagnet to a position effecting energization of said closing means, contact structure actuated by the circuit breaker substantially upon completion of its closing movement effectively to de-energize only the stronger electromagnet whereupon the weaker electromagnet attracts and holds the armature so long as said switch is held closed, a second switch for energizing said tripping means, and contact structure in circuit therewith moved to closed position upon closing of said circuit breaker.

9. A system for controlling the operation of a circuit breaker having closing means comprising a relay having a light armature, electromagnets of different strength for tending to effect movement of said armature in different directions and which are so poled that their fluxes traverse said armature in opposition, a switch for energizing said electromagnets to effect movement of said armature by the stronger electromagnet to a position effecting energization of said closing means, and contact structure momentarily actuated by the circuit breaker substantially upon completion of its movement effectively to de-energize said stronger electromagnet whereupon the armature is rapidly moved by the weaker electromagnet to a position in which it is held thereby despite the subsequent re-energization of the stronger electromagnet.

10. A system for controlling the operation of a circuit breaker having closing means, comprising a relay having an armature, electromagnets of different strength for tending to effect movement of said armature in different directions from an intermediate position, a switch for energizing said electromagnets when said armature is in said position to effect movement of the armature by the stronger electromagnet to a position effecting energization of said closing means, contact structure actuated by the circuit breaker substantially upon completion of its closing movement effectively to de-energize the stronger electromagnet whereupon the armature is moved to and held in a third position, and contact structure operated by movement of the armature to said third position for opening the circuit of said stronger electromagnet.

11. A system for controlling the operation of a circuit breaker having tripping means and closing means, comprising a switch member movable in one direction to effect actuation of said tripping means and in opposite direction to effect actuation of said closing means, a relay having electromagnets of different strength energized upon movement of said switch member in said opposite direction, an armature attracted by the stronger electromagnet from an intermediate position to effect actuation of said closing means, contact structure actuated upon completion of closing movement of the breaker effectively to de-energize the stronger coil whereupon the weaker electromagnet moves the armature to a position beyond said intermediate position to open the circuit of said stronger coil, and contact structure in circuit with said tripping means moved to closed circuit position by closing movement of the breaker.

GEORGE A. HEALIS.
HERBERT C. GRAVES, Jr.